3,153,759
APPARATUS FOR MEASURING THE HIGH FREQUENCY CURRENT AMPLIFICATION FACTOR OF TRANSISTORS
Susumu Yagyu, 2680 Sukegawa-Nakamachi, Hidachi-shi, Ibaragi-ken, Japan
Filed Aug. 22, 1962, Ser. No. 218,633
Claims priority, application Japan Aug. 31, 1961
2 Claims. (Cl. 324—158)

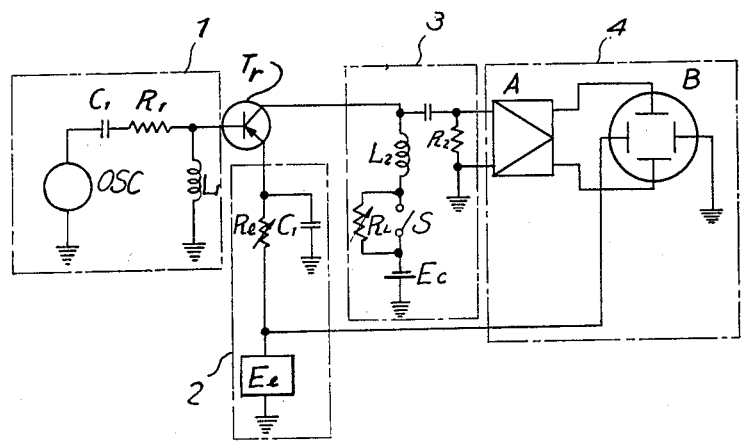

This invention relates to an apparatus for measuring characteristic values of transistor and more particularly to a measuring apparatus of high frequency characteristic values by which emitter ground amplification factor which represent the high frequency characteristic of transistors and similar characteristics can be directly viewed on a fluorescent screen of a cathode ray tube in response to variations in the operating point of the transistor to be measured.

In prior transistors of the emitter ground type, the high frequency current amplification factor of the transistors was often measured. Since in an apparatus most widely used for this purpose only a direct current biassing current was applied to the emitter electrode of a transistor to be measured, it has been necessary to adjust said biassing current and hence to vary the value of a series resistor provided for effecting said adjustment whenever the type of said transistor is varied. Accordingly a cathode ray tube oscilloscope used for observation must also be recalibrated at each time.

It has now been discovered that the adjustment of the biasing current and recalibration of the observing cathode ray tube can be made unnecessary by a novel arrangement wherein the output of an oscillator is applied to the base electrode of a transistor to be measured via a resistor, said base electrode is grounded through an inductance, a bias source is connected to the emitter electrode of said transistor, said bias source is also utilized to energize the horizontal deflecting plates of a cathode ray tube oscilloscope, the emitter electrode is also grounded through a condenser so as to render said transistor to act as emitter ground type with respect to the output of the oscillator and also to act as a base ground type with respect to the bias source and wherein a pulsating current produced by half wave or full wave rectification is utilized as the bias source.

Accordingly, one object of this invention is to provide a novel apparatus for measuring high frequency characteristic values of transistors such as their amplification factor in which it is not required to vary the biasing current and hence to recalibrate the cathode ray tube oscilloscope to effect direct viewing independent of the type of the transistor to be measured.

It is another object of this invention to provide an apparatus which enables direct viewing of the load characteristic of transistors.

Other objects and advantages of the invention will appear from the following description of the invention taken in connection with the accompanying drawing in which a single figure shows a connection diagram of one embodiment of this invention.

Briefly stated, according to this invention an apparatus for measuring high frequency characteristic values of transistors is comprised by an oscillator circuit with one terminal connected to the ground and the other end connected to the base electrode of a transistor to be measured via a base condenser and a base resistor, said base electrode being grounded through a base inductance, an emitter circuit which is grounded through a resistor and a bias source of pulsating current, said emitter circuit being also grounded through an emitter condenser, a collector circuit connected to the collector electrode of said transistor and an observation circuit serving to supply the output of said collector circuit along one deflection axis of a cathode ray tube oscilloscope and to apply the potential of said bias source of pulsating current along the other deflection axis of said oscilloscope. According to another feature of this invention said collector circuit includes a serially connected collector inductance, a switch which is shunted by a load resistor, and a variable collector source. The collector circuit is connected to the oscilloscope through an amplifier and a resistor with one end grounded is connected across the input terminals of said amplifier. With the switch closed the apparatus is utilized to measure by direct view the high frequency current amplification factor whereas when the switch is opened the apparatus is utilized to measure the load characteristic of said transistor.

Referring now to the accompanying drawing, the embodiment shown comprises an oscillator circuit 1 connected to the base electrode of a transistor $T_r$ to be measured, an emitter circuit 2 connected to the emitter electrode of the transistor, a collector circuit 3 connected to the collector electrode and an observation circuit 4 connected to the colleccior circuit 3 and the emitter circuit 2. One terminal of an oscillator OSC in the oscillator circuit 1 is grounded while the other terminal is connected to the base electrode of the transistor $T_r$ to be measured through a base condenser $C_1$ and a base resistor $R_1$. Between said base resistor and the base electrode is connected a base inductance $L_1$ with one end grounded. The emitter circuit circuit 2 includes a bias source $E_e$ of pulsating current. One terminal of this source $E_e$ is grounded and the other terminal connected to the emitter electrode of the transistor through an emitter resistor $R_e$. The emitter circuit 2 also includes an emitter condenser $C_2$ which connects the emitter electrode to the ground.

Output signals from the oscillator OSC are supplied to the base electrode of the transistor $T_r$ through the condenser $C_1$ and the resistor $R_1$ and by properly selecting the values of the base inductance $L_1$ and of the base resistor $R_1$ it is able to make sufficiently high the impedance on the base side of the transistor when looked from the oscillator side. At the same time it is also possible to make sufficiently low said impedance with regard to said bias source $E_e$ of pulsating current. Therefore the transistor may be considered as of a base ground type when looked from said bias source. Moreover, it is possible to make the emitter condenser $C_1$ connected in said emitter circuit to provide sufficient low impedance to the frequency of the output signal from the oscillator OSC. Thus the transistor may be considered as of an emitter ground type when looked from the oscillator side. It is preferable to use a half wave or a full wave rectifier as the bias source $E_e$ of the pulsating current. As described above, one terminal of this source $E_e$ is connected to the emitter electrode of the transistor via the emitter resistor $R_e$ while at the same time to the horizontal deflecting plate of a cathode ray tube oscilloscope B included in the observation circuit 4, and the other terminal of the source $E_e$ is grounded. The vertical deflecting plates of the oscilloscope B are connected to the output side of an amplifier A included in the observation circuit 4, the input terminals of the amplifier being connected across a grounded resistor $R_2$ in the collector circuit 3. This resistor $R_2$ is connected to the collector electrode of the transistor $T_r$ through a coupling condenser $C_3$. The collector electrode is also connected to the ground through serially connected collector inductance $L_2$, a switch 5 and a collector source $E_c$, and a variable load resistor $R_L$ is connected across the terminals of the switch S. It is advantageous to make the source $E_c$ variable so as to provide variable collector voltage and to measure this voltage by means of an indicating meter or a meter having a calibrated scale.

With the transistor $T_r$ to be measured connected as shown and the oscillator operated, the switch S is initially closed to short circuit the load resistor $R_L$. Since the source $E_e$ provides a pulsating voltage and this voltage is applied to the emitter electrode of the transistor $T_r$ and to the horizontal deflecting plates of the cathode ray tube oscilloscope B, it is clear that adjustment of the biasing current is unnecessary regardless the type of the transistor $T_r$ to be measured and since the horizontal axis is swept by a pulsating voltage obtained by rectifying an alternating current of 50 cycles per second it is possible to read directly the emitter current on the horizontal axis if said voltage were calibrated beforehand.

By designing the resistor $R_2$ connected on the input side of the amplifier A to have a sufficiently low value a voltage proportional to the current amplification factor of the transistor $T_r$ will be produced across the resistor $R_2$ which is amplified by the amplifier A and is then applied to the vertical deflecting plates of the oscilloscope B providing direct indication of the relation between the emitter current and the current amplification factor supplied to the vertical deflection plates. By suitable adjustment of the source $E_c$ it is able to know the relation between the emitter current and the current amplification factor caused by the variation of the voltage operating point of the transistor $T_r$. Conversely, it is possible to obtain an operating point which provides the maximum current amplification factor. Moreover, it is possible to read a particular frequency $f_T$ at which the amplification factor is equal to 1 on a scale along the vertical axis of the oscilloscope B.

When the switch S is opened to insert the load resistor $R_L$ in the collector circuit 3, the load characteristic of the transistor can be viewed directly on the oscilloscope screen. During this measuring operation too, the power consumption of the transistor $T_v$ is small because the source $E_e$ provides pulsating current.

While the invention has been explained by describing a particular embodiment thereof, it will be apparent that improvements and modifications may be made without departing from the scope of the invention as defined in the appended claims.

What is claimed is:
1. Apparatus for measuring high frequency characteristic values of transistors comprising an oscillator circuit with one terminal connected to the ground and the other terminal connected to the base electrode of a transistor to be measured via a base condenser and a base resistor, said base electrode being grounded through a base inductance, an emitter circuit which is grounded through a resistor and a bias source of pulsating current, said emitter circuit being also grounded through an emitter condenser, collector circuit means connected to the collector electrode of said transistor, observation circuit means comprising a cathode ray oscilloscope, means connecting said collector circuit means to one set of deflection electrodes of said oscilloscope and means for applying the potential of said bias source to the other set of deflection electrodes of said oscilloscope.

2. Apparatus for measuring high frequency characteristic values of transistors comprising an oscillator circuit with one terminal connected to the ground and the other terminal connected to the base electrode of a transistor to be measured via a base condenser and a base resistor, said base electrode being grounded through a base inductance, an emitter circuit which is grounded through a resistor and a bias source of pulsating current, said emitter circuit being also grounded through an emitter condenser, collector circuit means connected to the collector electrode of said transistor, observation circuit means comprising a cathode ray oscilloscope, means connecting said collector circuit means to one set of deflection electrodes of said oscilloscope and means for applying the potential of said bias source to the other set of deflection electrodes of said oscilloscope, said collector circuit means including a collector inductance which is connected to the collector electrode of said transistor, a switch and variable collector source serially inserted between said collector inductance and the ground, a load resistor connected in parallel with said switch, a coupling condenser connected with said collector electrode and a resistor connected across the input terminals of an amplifier in said observation circuit, one end of said last mentioned resistor being grounded.

No references cited.